United States Patent [19]

Hansmann

[11] 3,997,769
[45] Dec. 14, 1976

[54] DIGITAL DECADIC INDICATOR DEVICE FOR MEASURED VALUES

[76] Inventor: Gunter Hansmann, Herzberger Landstrasse 81, 3400 Gottingen, Germany

[22] Filed: Dec. 5, 1974

[21] Appl. No.: 529,967

[52] U.S. Cl. .................. 235/151.13; 235/151.33; 177/25; 177/210 R; 177/DIG. 3

[51] Int. Cl.² ................. G06G 7/48; G01G 19/40; G01G 19/04; G01G 3/14

[58] Field of Search .............. 177/1, 210, DIG. 3; 235/150.53

[56] References Cited

UNITED STATES PATENTS

| | | | |
|---|---|---|---|
| 3,565,193 | 2/1971 | Wirth | 177/210 X |
| 3,705,297 | 12/1972 | John | 235/150.53 |
| 3,816,156 | 6/1974 | Baumann et al. | 177/210 X |

*Primary Examiner*—George H. Miller, Jr.
*Attorney, Agent, or Firm*—Flynn & Frishauf

[57] ABSTRACT

A digital decadic indicator for measured values in which the object of the invention is to indicate along with the measured values the associated accidental so-called Gaussian measurement error. This is achieved by providing in the indicator a means for indicating by electronic methods the measurement error. The unit used for the electronic calculation is advantageously built into the measuring device.

7 Claims, 5 Drawing Figures

DIGITAL DECADIC INDICATOR DEVICE FOR MEASURED VALUES

The invention relates to a digital decadic indicator for measured values.

In the case of many physical and technical measurements, the measured values are given in the form of digital decimal numerical values. It is known to process these values to a Gaussian error calculation. If x represents the measured values, $n$ the number of values, and $\bar{x}$ the arithmetic mean of the measured values, then the standard deviation $\sigma^2$ from the mean is given by the following equation $$\sigma^2 = \frac{\Sigma x^2 - n \cdot \bar{x}^2}{n-1}$$

Furthermore the confidence interval $v_M$ for the mean of the measured values is defined by $V_M = (\sigma/n)$ see for example Wilh. H. Westphal, "Physikalisches Praktikum", p.12, published by Friedr. Vieweg & Sohn, Braunschweig, 1966. Previously the standard deviation was known as "the mean quadratic error of individual measurements". The confidence interval of the mean value was previously known as "the mean error of the mean value". The connection between a standard Gaussian distribution of measured values and the actual measured values is expressed by the so-called Lewis number L. This is the ratio $L = (\sigma^2/s^2)$ where $\sigma^2$ is the standard deviation as actually measured and $s^2$ the standard deviation as given by the Gaussian normal distribution, see example: Karl Wellnitz, "Moderne Wahrscheinlichkeitsrechnung", p. 83 et seq., published by Friedr. Vieweg & Sohn, Braunschweig, 1964. There is in fact a close connection between the curve of normal Gaussian distribution and the Heisenberg uncertainty relation, see example: W. Heisenberg, "Physikalische Prinzipien der Quantentheorie", p. 14, vol. 1, Hochschultaschenbucher, Bibliogr. Inst. Mannheim/-Wien/Zurich, Vol. 1, 1958 and A. Flammersfeld, K. Bechert, and Ch. Gerthsen, "Atomphysik", Vol.III, P. 29 et seq. 3rd Ed., Sammlung Göschen Vols. 1123/1123a, published by Walter de Gruyter & Co. Berlin 1954. When the Lexis number approximates to 1, then the measured values must have the standard Gaussian distribution and must thus satisfy the Heisenberg uncertainty relation with "equals" signs in the basic physical data. What is measured then is the maximum in precision that can be achieved i.e. the measurements have the smallest error physically possible.

The curve of standard Gaussian distribution with $$c = nw(1-w) \text{ is } g(x) = \frac{1}{\sqrt{\pi \cdot c}} e^{-\frac{x^2}{c}}$$

and gives the probability g(x) of a measured value M occurring in a series of $n$ similar measurements with a frequency which deviates from the most probable frequency by an amount x. In the definition for c W is the probability with which the measured value M will appear in the series. $s^2 = (c/2)$ is the standard deviation of the Gaussian normal distribution.

Also applicable is $$s = \frac{1}{g(O)\sqrt{2 \cdot \pi}}$$

To calculate $g(O)$, intervals of increasing width B are formed about the mean value $\bar{x}$ as a centre point. The number $n_B$ of measured values in the interval of width B is then divided by that width and a fraction $b = (n_b/B)$ produced. For a given width of the finite and non-vanishing intervals (this may for example be a minimum width dictated by the device used) the fraction b has a maximum value $b_{max}$. The associated value of the numerator $n_B$ is divided by the total number of measured values $n$. This gives $g(O) = n_B/n$. From this can be calculated $s^2$ above and thus the Lexis number L.

What Gaussian error calculation involves is thus the storage of digital decimal measured values which are received in temporal succession. In the course of this, groups are formed, each composed of quantities of similar measured values. This quantity is termed the "weighting" of the measured value. The following operations are then performed on the measured values: additions, division, quadratic multiplications, formations of sums and differences, calculations of square roots and the determination of maximum values.

Error calculation is applied to measurements made in physics, chemistry and engineering in order to evaluate critically their accuracy. This may lead, inter alia, to the realization that a certain measuring device is unsuitable for the purpose for which it is being used. Such error calculation may also suggest, especially when the Lewis number is other than 1, that systematic errors exist and this can, in certain cases, lead to recognition of the fact that the measuring device used is no longer operating with adequate efficiency or that there is a fault on the operator's part.

It is known for the storage and calculating processes described to be carried out by miniaturised electronic components. Furthermore it is known to indicate in the case of a finite number of measured values the result of the error calculation (e.g. with luminous digital indicator tubes) within a very short time by combining such components into suitable circuits. It is further known to be possible to combine all the components required for Gaussian error calculation into an integrated circuit component. Reference is made in this connection to the products of the electronic semiconductor industry.

German Patent No. 1 549 388 discloses a device for calculating statistical error automatically. In the case of this German patent and in contrast to the present invention differing electrical quantities are converted into numbers of pulses, the numbers being proportional to these quantities. These numbers are divided into classes, and the statistical error is determined from the frequency of the classes. In the case of the present invention the digital measured values which are indicated decimally serve as the starting point for the error calculation.

The object of the invention is thus to indicate along with a measured value the associated accidental so-called Gaussian, measurement error.

Subject matter of the present invention:

A digital decadic indicator device for a set of measured values, obtained in a measuring apparatus from a series of repeated measurements, is provided with means for indicating, by electronic methods, the associated, so-called accidental (Gaussian) measurement error between the individual measurements of the set of measurements. The unit used for the electronic error calculation is advantageously built into the measuring device.

Figure 1:
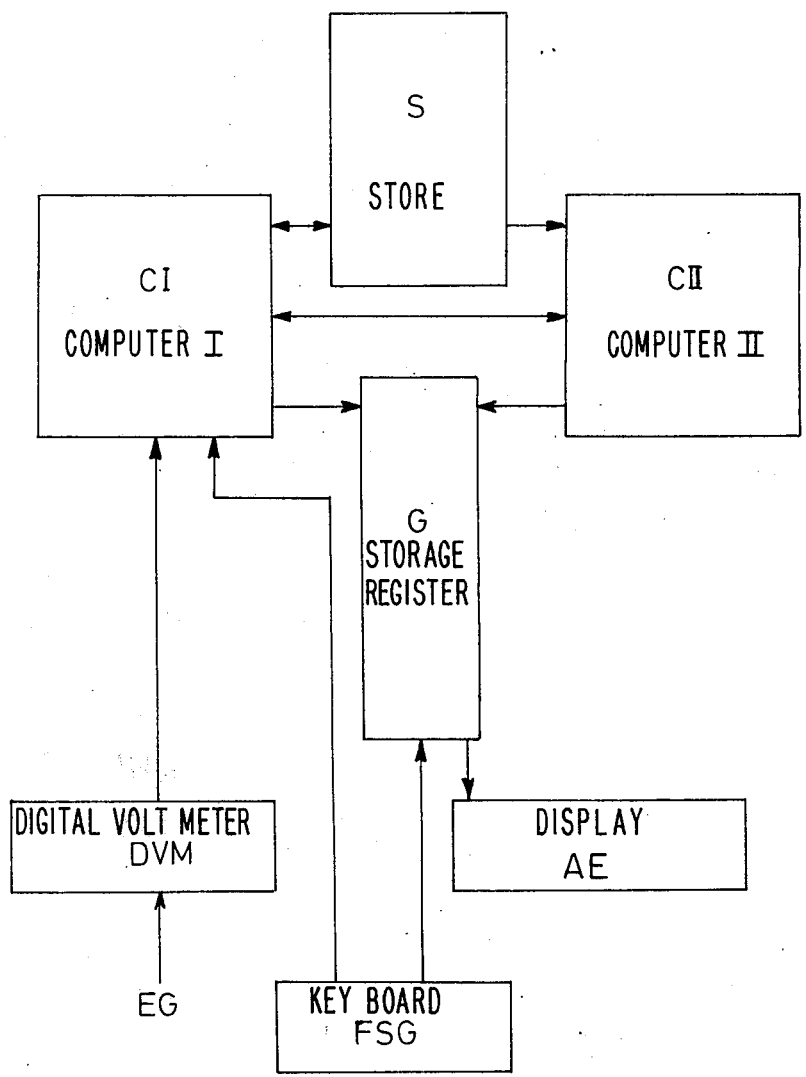
FIG. 1 is a general, highly schematic block diagram of the components of a computation unit, for association with an electronic indicating weighing device, or electrical scale.
Figure 1A:
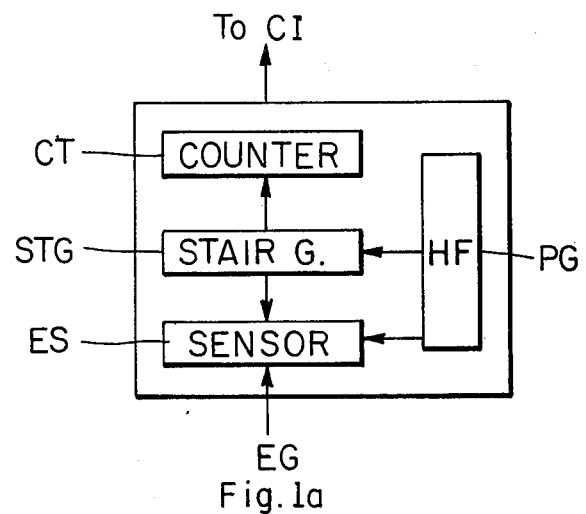
FIG. 1a is a highly schematic block diagram of a digital volt meter, of the type providing digital outputs from analogue voltage inputs.

The way in which the error indicating unit operates will be described with reference by way of example to an electronic DC digital voltmeter. It is known that in a digital voltmeters (DVM) voltage pulses extending through time may be regard as the basis for measurements. The level of the voltage pulses may be approximately $10^{-5}$ volts. The temporal length of the pulses may be approximately $10^{-7}$ seconds, if they are as known, quartz-stabilised. These voltage pulses, generated in a pulse generator PG (FIG. 1a), can be considered as linked together electronically into a temporal staircase progression in a stair case generator STG until an electronic sensor ES determines that the staircase has reached the level of the voltage which is to be measured. A concurrently operating electronic pulse counter CT controls the indications on an illuminated decimal digital display AE (FIG. 1). The latter shows in volts the product of counting steps times electrical pulse levels. Using the values just mentioned a DVM can give an exact measurement of a voltage of approximately $10^2$ volts in about a second to a total of seven places of decimals. The accuracy of the indication may be reduced by two places and a voltage of $10^2$ volts then be indicated accurately to a total of five decimal places 100 times a second.

Decreasing the accuracy of the indication increases the speed of measurement. This allows to indicate virtually without delay, AC voltages below about 10 KHz whose indication can no longer be taken in subjectively by the eye and thus read off. On the other hand, electronic data stores having short access - and readout times are capable of storing individually the measured values which are indicated digitally in temporal succession. These values can then be further processed for calculating operations by way of a program in an electronic computer. "Computing digital voltmeters" may be used, as derived for AC and DC voltages, and which indicate as desired the temporal or arithmetic mean or effective values of AC voltages and AC voltage pulses of less than 10 KHz.

For a Gaussian error calculation of voltage measurements, this yields such a large amount of information that the physical limitations of measurement have to be borne in mind if the electronic computing section is to be made of the reasonable capacity. Information on the physical limitations on measurement is given by the Heisenberg uncertainty relation.

Measuring DC voltages with a sufficiently sensitive DVM produces a large quantity of measured values since DC voltages are subject to thermostatistical fluctuations. At suitable intervals the measured values existing at the instant concerned are extracted electrically or electronically from this large quantity of measured values, are stored, subjected to the error-calculating process, and indicated according to the invention in the same measuring device. The appropriate time intervals may be set in advance by a selector, or be selected by the operator, e.g. by by operating a switch at desired moments.

Electronic change-over means make if further possible to use for instance the illuminated display of the digital voltmeter to show the following indications if desired: instead of an indication of a voltage of a certain time, it is possible to form an arithmetic mean for a number of discrete voltage values which are received at specific intervals and to indicate it together with the associated accidental measurement errors. The indication of the error may be that of a standard deviation of an individual value, if necessary with the associated statistical reliability; alternatively, the indication may be that of confidence interval of the mean value, again, if necessary with the associated statistical reliability or the indication may be that of the relative percentage value of the confidence interval or the mean quadratic error of the mean measured value. If desired, the Lexis number provides information on whether the maximum possible precision has been achieved, i.e., whether, for example, in measuring a voltage U the Heisenberg uncertainty relation in the form $$(\Delta u/u \, I.U.t.\Delta t = h/2$$

has been satisfied. In this, $\Delta u$ is the confidence interval for the mean $\bar{x}$ of the measured values of U. $\Delta t$ is the electronic measuring duration or access time with which the voltage U has been read off. This is a whole-number multiple of the pulse length mentioned above. It is counted in respect of time intervals during which the sensor mentioned above records equality of the voltage to be measured and the voltage as indicated. If I is the current flowing in the measuring circuit of the DVM during measurement over a time interval $t$, then $I.U. \, t$ is the electrical energy E used for measurements expressed in Wattsec. If $\Delta E$ is the uncertainty of E, then $\Delta E = \Delta I.U.t. + I.\Delta \, U.t. + I.U \, \Delta \, t$. When multiplying this equation by $\Delta t$, the last of these three times is to be ignored. The electrical energy E can also be defined as $I.U.t = N.^*K.T.$ wherein $k$ is the Boltzmann constant and $I$ the absolute temperature of measurement, while $N^*$ is to represent a type of number giving the number of electrons participating in the measuring operation. This is just to recall the fact that under the Law of Equal Distribution in Thermodynamics the amounts of energy $\Delta I.U.T.$ and $I.\Delta \, U. \, t$ are equal. This is altogether an indication of the temperature T having to remain constant during the measuring operation and of the number of electrons involved having to remain the same, i.e. this number must not be altered e.g. by — electronic — switching. The length of time $t$ selected must then be approximately the interval of time in which these conditions are fulfilled. The longer this length of time, the more exact for example the measurement of the voltage. The Heisenberg uncertainty relation calls for a very long access time $\Delta \, t$ for a great accuracy in the measurements taken. Great accuracy in measurements entails a large number of decimal places in the DVM display. Such indications can only be given by the DVM in the time practically available, if the DVM uses very short voltage pulses of the type mentioned above. The access time needs therefore to be made up of a very large number of very short pulse periods.

The Lexis number tells us at least whether the maximum attainable precision has been achieved. If this is not the case, it means that the measurements are still incapable of physical improvement. Operator's error or a systematic influence may for instance be the cause for the precision being below its optimum.

It is also possible for an indication of error to be given on a number of specially provided luminous digital indicator tubes which are arranged in the same display area of the DVM as the voltage indicators and adjacent to the latter. It is not essential to employ here luminous indicator tubes as other electronic digital illuminated indicator elements can be used instead.

Figure 4:
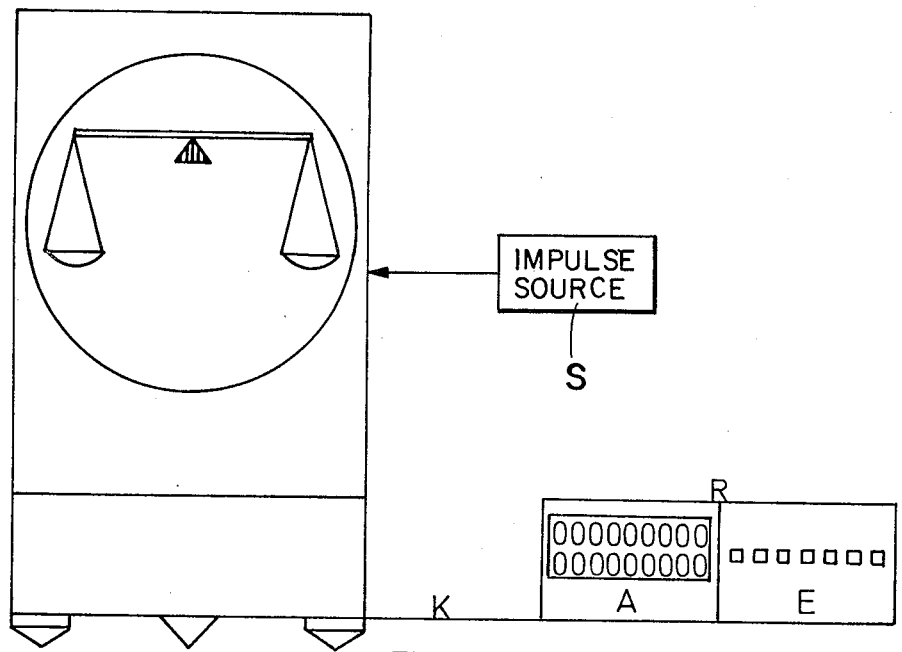
FIG. 4 is a schematic front view of another embodiment of an electronic scale with separate display units.

As a further example, there will now be described how simultaneous electronic indication of error is effected in weighing operations using a weighing machine which gives digital indications. A digital indication of the weight may be read off, for example, from an indicator scale. For this purpose devices are available as known which read written or printed characters automatically and allow the indications to be evaulated electronically. Furthermore, so-called printing weighing machines are known which feed the result of a weighing operation to an electronically operated printer, provision being also made for the result being read off on a scale of the weighing machine. In both types of weighing machines, the result of the weighing operation can be fed to an electronic store in digital form. To determine accidental errors (only these can be satisfactorily dealt with in the present case) it is necessary for the results to be available of a number of weighings made repeatedly in the course of one weighing process. To this end a pan charged with articles to be weighed may be briefly displaced from its position of equilibrium by, for example, an electronically or pneumatically generated mechanical impulse from an impulse source S (FIG. 4). Each time a set, equilibrium or rest state is reached, the weight is measured electronically, stored and subjected to error calculation. Measurements may also be taken during swinging in and prior to the state of equilbrium being reached so long as the indication of the final result is situated on a Gaussian curve of measurement error distribution. The error indication is effected here in a special section which, in accordance with the invention, is situated near or in the section for the weight indications and which is built into the weighing machine. Preferably on electronic computer section of adequate size is also built into the weighing machine from the start. Where automatic character recognition is provided the mean value of weights can be indicated together with the associated error, as described above after at least two weighings using the data available. Furthermore, it is possible in known so-called electronic weighing machines in which the illuminated display of a DVM is calibrated in weights for this display to follow thermostatistical fluctuations in weight in a physically satisfactory manner. The fluctuations in question are those of the beam of the weighing machine about the position of equilibrium. As described above, a large quantity of data of weighings can be obtained by DVM's. In the case of continuously repeated weighing of one load their mean value and the associated error can also be continuously calculated afresh from the data supplied. The process of repetitive weighings may for example be interrupted if the indicated error ceases to change to any substantial degree and the Lexis number becomes unity, i.e. L = 1. In this event the maximum precision has been achieved and the relationship $\Delta E . \Delta t \geq$ has been satisfied in the form of the Heisenberg uncertainty relation $\Delta E . \Delta t =$ wherein $E = m/2 . v^2 = \frac{1}{2} k . T$ is the kinetic energy of the positively guided mass $m$ weighed with the (thermal) speed v, T is the absolute temperature during the weighing operation and $k$ is Boltzmann's constant. As a result of the Law of Equal Distribution in Thermodynamics $$\Delta E = \Delta m/2 . v^2 + m . v . \Delta v = \Delta m . v^2 \ldots \Delta m . v^2 = (\Delta m/m) . k . t .$$

applies and so, for weighing at a room temperature of 20° C, the Heisenberg uncertainty relation is $$(\Delta m/m) . \Delta t = 0,26 . 10^{-13} \text{ sec.}$$

wherein $\Delta t$ is the (electronic) access time in which the weighed value is read off as a mean. As described above the DVM's, this access time is a whole-number multiple of the impulse length mentioned above. There have been approximations according to which weighings have actually achieved the degree of accuracy mentioned. A number of equal values obtained from repetitive weighings of the same load are called the "weightings" of the measured values. The sum of all weightings then forms the whole-number multiple mentioned above. By storing the weighting values and the associated measured values it is possible to design the lay-out of electronic stores more rationally. From the store the whole-number multiple as the total number of measured values and thereby also the access time $\Delta t$ can be selectively called up and displayed. The last unbalanced equation shows that, as a result of the Heisenberg uncertainty relation, weighing can be performed with any desired accuracy and despite the Gaussian error to which the measurements are subjected, provided only that the access time is long enough, i.e. provided that the weighing operation is of sufficiently long duration. From the point of view of the physicist this supports the case for a technical standard weight and a technical standard mass.

If the Lexis number $L \neq 1$, early conclusions can be drawn from the way the error occurs such as that there is malfunctioning or incorrect use of the weighing machine, including mishandling of the articles forming the load. This means a considerable improvement in fault detection in weighing machines. This aspect may also be used to improve and speed up the mechanical adjustment of weighing machines during their manufacture.

A flow-plan of the calculating process is given in the following by way of example.

1. A "Measure" key is actuated. This initiates steps 2 to 26 as follows:

2. Measured values $x_i$ from a digital voltmeter (DVM) pass to a computer CI. Only the varying places, say the last three, four, five, etc., of the measurements $x_i$ are to be subjected to the calculating process. The other places of $x_i$ which are constant are stored by CI in a register G at a first store location $G_1$.

3. CI stores the varying places of, for example 50, measured values $x_i$ in a store S.

4. Computer CI first calls up the $x_i$ which is first in time and cancel-stores it in register G at location $G_2$. "Cancel-store" means that a number existing at the point of storage is cancelled when a new number is stored therein.

5. There is allocated to each call-up in stage 4 a counting step $n$ which gives the number of measured values involved in the calculation. The number $n$ is cancel-stored at location $G_3$.

6. CI calls up the value $G_3$ and calculates, successively: $1/n$; $n-1/n$; $1/n-1$; $n/n-1$. These values are cancel-stored at $G_4$, $G_5$, $G_6$ and $G_7$ respectively, though $1/n - 1$ and $n/n - 1$ are only so stored when $n \geq 2$.

7. From the measured value $x_n$ last stored at $G_2$ a new mean $\bar{x}_n$ is continuously formed using the numbers from $G_4$, $G_5$ and $G_6$, this mean to be accurate to four to eight places.
the formula being $$(\bar{x}_n = (\bar{x}_{(n+1)}) (n-1/n) + (x_n(1_n)$$

8. $\bar{x}_n$ is continuously cancel-stored in location $G_8$ preprogramming being effected by pressing key $x_0 = 0$. At the same time the previous mean $\bar{x}_{n+1}$ is cancel fed into register location $G_9$.

9. $G_1$ and $G_2$ called up and $\bar{x}_n^2$ formed. Latter stored at register location $G_{10}$. $G_1$ and $G_9$ called up and $x_n^2$ formed. Latter stored at register location $G_{11}$.

10. Values from $G_4$, $G_5$, $G_{10}$ and $G_{12}$ called up and value $$\frac{\sum_i^n x_i^2}{n}$$

formed from $$\frac{\sum_i^{n-1} x_i^2}{n-1} \cdot \left[\frac{n-1}{n}\right] + x \frac{2}{n} \cdot \frac{1}{n}.$$

This value is stored at register location $G_{12}$. By pressing the key in step 1 a 0 was stored there initially.

11. The absolute value $$\left| \frac{\sum_i^n x_i^2}{n} - \bar{x}_n^2 \right|$$

is formed and cancel-stored at location $G_{13}$ of register G.

12. Register locations $G_6$ and $G_{13}$ are called up and the $$\text{term} \left| \frac{\sum_i^n x_i^2}{n} - \bar{x}_n^2 \right| \cdot \frac{1}{n-1}$$

calculated and cancel-stored at location $G_{14}$ of register G.

13. The value at $G_{14}$ is called up and its square root extracted. With the sign ± added, this gives the (mean) error $\Delta \bar{x}_n$ of the mean value $\bar{x}_n$. This value is cancel-stored at location $G_{15}$ of register G.

14. The values from locations $G_3$ and $G_4$ are called up and multiplied with each other. The product is the mean quadratic deviation or standard deviation by the individual values $x_i$ from the mean value $\bar{x}_n$. The product is given the sign ± and cancel-stored at location $G_{16}$.

15. $G_{16}$ is called up and its root extracted. A value is obtained for scatter or the mean value for particular values of $x_i$ ($i = 1, \ldots, n$). This value is given the sign ± and is cancel-stored at location $G_{17}$.

16. Beginning when $n \neq 2$, a self-contained section CII of the computer calls up the values $\bar{x}_n$ from $G_8$ and $\bar{x}_{n+1}$ from $G_9$. The absolute difference $$(\bar{x}_n - (\bar{x}_{n+1}) = \bar{x}_n - \bar{x}_{n+1}$$

is formed from these and cancel-stored at $G_{18}$.

17. A number $z = 001$ or $0001, \ldots$ etc. is formed using respective places from the store S (see step 2) and stored at location $G_{19}$.

18. Computer CII calls up the values from $G_{18}$ and $G_{19}$ and compares them to find whether $|\bar{x}_n - \bar{x}_{n+1}| < z$ that is to say whether the means of the measurements fluctuate to a limited degree.

19. The comparison of step 18 can be repeated by computer CII, with increasing values of n, until the equation of unbalance of step 18 is satisfied. This should have happened by $n = 50$. Should this not be the case, it would first of all be necessary for the storage capacity to be increased so that a hundred, two hundred etc. input values could be stored. If suitably programmed and constructed, computer CII could firstly report this and secondly take appropriate action. If it was still not possible to arrive at an approximation under step 18 the computer could report that it was not set for or capable of handling the problem, and if the problem was incapable of being subjected to error calculation that there was a fault, for example in the measurement.

20. It is assumed that condition 18 has been fulfilled at the latest when n = 50 or 100, 150, etc. The values at $G_8$ and $G_9$ are then called up and their sum $\bar{x}_n + z = \bar{x}_n + 001$ formed and stored at $G_{20}$. Similar storage takes place at location $G_{21}$ in the case of the difference $\bar{x}_n - z = \bar{x}_n - 001$.

21. All the values $x_i$ are called up one after another from store S and compared. When they are in the range between $\bar{x}_n - 001$ and $\bar{x}_n$, they are counted and the quantity $m$ stored at location $G_{22}$. When they are in the range between $\bar{x}_n$ and $\bar{x}_n + 001$ they are also counted and this quantity called k stored at location $G_{23}$. After this all the measured values in store S are cancelled and the store thus becomes capable of accepting the next quantity of measured values called $g$.

22. In the case of the method employed it is important for the values $\bar{x}_n$ at location $G_{15}$ to form a regularly decreasing series of numbers. The value $\bar{x}_{n+1}$ is therefore taken over at step 13 and stored at location $G_{24}$. As long as in the proceding course of calculation $$\Delta \bar{x}_n < \Delta \bar{x}_{n+1}$$

section CII of the computer does not give a warning to draw attention to differing behaviour.

23. The values from locations $G_{22}$ and $G_{23}$ (i.e. m and k) are called up and compared with each other. The larger of these two values gw is storwd at location $G_{25}$.

24. The number n from location $G_3$, and location $G_{25}$ are called up. The number $$\frac{n^2}{gw^2 \cdot 2}$$

is calculated from them and stored at location $G_{26}$ being the value of $S^2$.

25. The values of locations $G_{16}$ and $G_{26}$ are called up and the value for standard deviation from $G_{16}$ is divided by the value from $G_{26}$. A value is obtained for the Lexis number L and this is cancel-stored at location $G_{27}$. If this number is approximately 1 all previous measurements are physically in order. In this case the mean value $\bar{x}_n$ may for example be considered as the true value for the measurement with an error $\pm \Delta \bar{x}_n$, which may sometimes be smaller than the last place of the measured values in S. This means that it is possible under certain circumstances to extract from the measured values a degree of accuracy which is greater than can be read off from the measuring instrument itself.

26. There is a further criterion which determines whether the measured values $x_i$ are located on a Gaussian curve of error distribution and thus whether they measurements are satisfactory from a physical point of view. Due to the decimal alignment of the measured values in store S all the values $x_i$ in the range between $\bar{x}_n - 001$ and $\bar{x}_n$ are the same distance $\delta_1 x = \bar{x}_n - x_i$ from the mean value $x_n$. Likewise all the measured values $x_j$ in the range between $\bar{x}_n$ and $\bar{x}_n + 001$ are the same distance $\delta_2 x = x_j - \bar{x}_n$ from the mean value $x_n$. These numbers are immediately accessible. If the value at register location $G_{16}$ is assumed to be equal to $s^2$, then for the measurements to be physically satisfactory, $$\frac{m}{k} \approx e - \delta_1 x^2 - \delta_2 x^2$$

must be satified. The $m$ and $k$ are derived from registers $G_{22}$ and $G_{23}$, respectively. The latter expressions may also be written $$H = \frac{k}{m} e - \delta_1 x^2 - \delta_2 x^2$$

in which case $H \approx 1$ must true if the measuring process is to be physically unexceptionable. The value of H may be stored at location $G_{28}$.

For the sake of clarity values at the various location in the register are tabulated below. Up to register location $G_{17}$ they represent approximately the known process for calculating the standard deviation, or Gaussian error. The steps thereafter are used to calculate the Lexis number L or the value of H and thus to evaluate the physical quality of the measuring process.

| Register Location | | Value contained |
|---|---|---|
| $G_1$ | $x_i$) | Fixed starting places for all measured values |
| $G_2$ | $(x_n$ | Fixed number of variable final places of measured values $x_n$ |
| $G_3$ | $n$ | Serial number of measured value |
| $G_4$ | $\frac{1}{n}$ | |
| $G_5$ | $\frac{n-1}{n}$ | |
| $G_6$ | $\frac{1}{n-1}$ | When $n \neq 2$ |
| $G_7$ | $\frac{n}{n-1}$ | When $n \neq 2$ |
| $G_8$ | $(\bar{x}_n$ | Mean value of the variable final places of all the measured values up to and including measured value $x_n$ |
| $G_9$ | $(\bar{x}_{n-1}$ | |
| $G_{10}$ | $x_n^2$ | |
| $G_{11}$ | $\bar{x}_n^2$ | |
| $G_{12}$ | $\frac{\sum_i^n x_i^2}{n}$ | |
| $G_{13}$ | $\left\| \frac{\sum_i^n x_i^2}{n} - \bar{x}_n^2 \right\|$ | |
| $G_{14}$ | $\frac{\sum_i^n x_i^2}{n} - x_n^2 \cdot \frac{1}{n-1} = z$ | |
| $G_{15}$ | $\pm \Delta \bar{x}_n = \sqrt{z}$ | Mean error $\Delta \bar{x}_n$ of mean value $\bar{x}_n$ |
| $G_{16}$ | $Z \cdot n = s^2$ | Standard deviaton by individual values |
| $G_{17}$ | $\pm s$ | Scatter of individual values $x_i$ |

-continued

| Register Location | Value contained | |
|---|---|---|
| $G_{18}$ | $\lvert \bar{x}_n - \bar{x}_{n-1} \rvert$ | |
| $G_{19}$ | $(z = 001$ | |
| $G_{20}$ | $(x_n + (z$ | When $x_n - x_{n-1}$ 001 |
| $G_{21}$ | $(x_n - (z$ | |
| $G_{22}$ | $m$ | |
| $G_{23}$ | $k$ | |
| $G_{24}$ | $\Delta x_{n-1}$ | |
| $G_{25}$ | $gw =$ | |
| $G_{26}$ | $\dfrac{n^2}{gw^2 \cdot 2\pi}$ | |
| $G_{27}$ | $\dfrac{s^2 \cdot gw^2 \cdot 2\pi}{n^2} = L$ | Lexis number |
| $G_{28}$ | $H$ | |

By selectively operating press buttons it is possible to call up numerical values from, for example $G_1 + G_2$, $G_3$, $G_1 + G_8$, $G_{15}$, $G_{16}$, $G_{17}$, $G_{27}$ and $G_{28}$ and display them on the luminous display. By selecting infed values $x_i$ along a Gaussian error distribution curve it is even possible to gain an indication of the physical standard to which the computer being used and its ancillaries are operating.

The program described can be calculated with for example the MCB 8–10 Microcomputer System and ancillaries manufacture by the Intel Corporation of Santa Clara, California 95051, USA. This system includes a programming unit into which a fixed programme can be fed via a teletype apparatus. The chips into which the programme can be fixedly programmed are such that they can be erased again by a physical process. In this way the programmes can be adapted in the optimum way to the physical problem. They may therefore also be so drawn up that the input of the Microcomputer System can be connected to the BCD output of a digital voltmeter which supplies the measured values. To display the relevant data in the Micrometer store, the modular system for numerical display units manufactured by Electromatic M. Rundel of D-7250 Leonberg, Germany, is, for example, suitable, when appropriately assembled.

The press-button operation which causes the appropriate indicated values to be displayed can, in this system, be performed on suitably programmed keys on the teletype infeed apparatus by means of which programming is effected.

For commercial purposes the computer method described can be embodied in a so-called integrated circuit. With such a circuit, which operates with miniaturised integrated semi-conductor components, the computer as a whole may be so reduced in size that it can be built physically into the measuring apparatus concerned, e.g. a digital voltmeter or a weighing machine. Such computers are supplied to customers' requirements by Siemens, of Munich, Telefunken, of Germany, Hewlett Packard of the USA, Texas Instruments of USA, etc..

A simple example of application is offered by the measurement of the voltage of a standard element using a DVM of suitable sensitivity and the error calculation process above described. In this instance it can be seen how the Gauss-Heisenberg distribution curve approximates to a Dirac function.

The procedure for indicating measurement error when weighing by means of weighing machines will now be explained with reference to drawings.

FIG. 1 is a block diagram of a computer calculation circuit. EG is the voltage input to a digital voltmeter DVM for analogue measured values obtained when weighing is carried out on electrical weighing machines. The digital voltmeter operates as an analogue/digital converter and should have a BCD, (binary coded decimal) output. Coded measured values pass from the TVM to a first computer unit CI. A certain number of them forming a set are stored in a store S(see step 3 above). From there the measured values are called up individually and a Gaussian error calculation is performed on them in first computer CI. The values which are continuously re-calculated are stored in a storage registered G where it is on call. A calculation is performed in second computer unit CII to determine whether the measured values in store S satisfy a Gauss-Heisenbergian distribution function, or, in other words, the calculation of the Lexis number L. The result of this is also stored in register G where it is on call.

By operating the keys of a teletype apparatus FSG, for example the calculated values can be called up from register G and displayed in the display unit AE. The computer units CI and CII and the stores G and S may be combined into a single computer. This will be referred to as the computer unit R. The display unit AE and the display panel of the DVM may be combined into one display unit A (FIG. 2) for decimal numbers. When CI and CII (or R) have been programmed, the place of the keys of FSG may be taken by the keys (or buttons) of an input setting unit E (FIG. 2).

Figure 2:
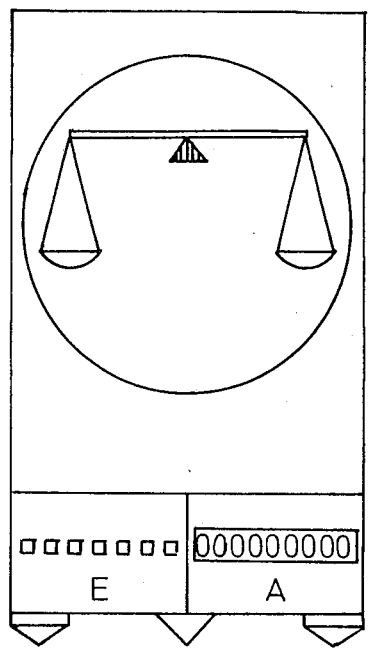
FIG. 2 is a schematic pictorial front view of an electronic indicating scale.
Figure 3:
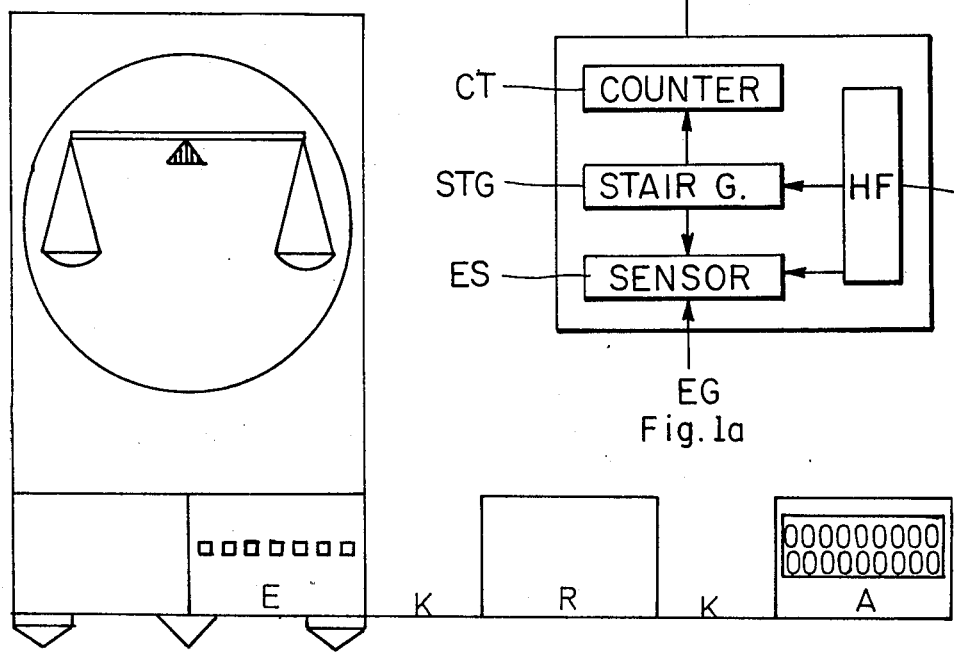
FIG. 3 is a schematic front view of an electronic indicating scale with separate computation and display units.

FIG. 2 is a diagram of an electronically indicating weighing machine. A represents the display unit, which may consist of a suitably calibrated DVM. E represents the setting unit for operating the weighing machine. In FIG. 3 the display unit A is separate from the weighing machine and connected to it by a cable K. In this instance, there is inserted into the cable K the computer unit R which is used for error calculation and which may contain the electronic data store. In this way it is possible, for example, by action at E to call up as desired the errors in the weighings or the access time $t$ and to display them on or near the unit A.

FIG. 4 shows a setting unit E which is separate from the weighing machine and connected to it, by means of a cable K, the setting unit being combined with the display unit A to form a larger unit which also contains the computer unit R.

Figure 5:
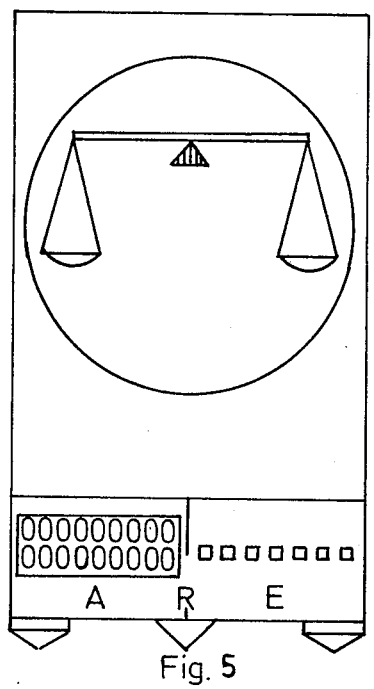
FIG. 5 is a schematic front view of a combined electrical scale, computation, and input-output unit.

In FIG. 5 the entire combined unit of FIG. 4 is shown as being built into the weighing machine. This combined unit R can, if desired, be made removable, so that the weighing machine can be used either as shown in FIG. 4 or in FIG. 5. When used in the form shown in FIG. 4 the weighing machine is not subjected to the elevated temperatures which occur as a result of resistance heating in the combined unit R, setting unit E and display unit A. By providing means for selecting the displayed matter it is possible to simplify the display unit shown in FIG. 5 so that it has the same external appearance as the display unit in FIG. 2 which has only one row of indicator tubes.

What is claimed is:

1. A digital, decimal measuring and readout device to indicate measured values, obtained in a measuring apparatus which performs a series of repeated measurements and provides a set of respective, measured output signals (eg), comprising means (S) storing the individual output signals of the set of signals;

and first computing means (C I;9) operating on the individual output signals of the set stored in the storing means to calculate the associated, accidental or Gaussian measurement error forming the Gaussian standard deviation, from the mean, associated with each measurement value as represented by the respective individual output signals of said set of output signals.

2. A device according to claim 1 further comprising second computing means (C II) operating on the individual output signals of the set to calculate the Heisenberg uncertainty relation, said second computer means including comparison means connected to said first computer means to compare the calculated result from the Heisenberg uncertainty relation with, and to check for conformity with the Gaussian error distribution curve.

3. A device according to claim 1 having an output display unit (AE) including a common display for the measured values and the measurement errors, the display of the measurement error being connected to and controlled by said first computer means (C I;9).

4. A device according to claim 1 in which the measuring apparatus is an electronic scale, or weighing machine and said device includes a display unit (AE) which is connected to and controlled by the scale, and indicates the amount weighed and which is further connected to and controlled by the said first computer means (C I;9) to display the error of the weight.

5. Device according to claim 1 to measure the values of physical characteristics of articles, further including means (S) to repeatedly, briefly displace the articles on the device to obtain said series of repeated measurements.

6. Device according to claim 1, wherein the measured value comprises the weight of articles, and the device comprises a scale;

said device further including means briefly, repeatedly, displacing the articles on the scale to provide said series of measurements.

7. Device according to claim 6, wherein said displacement means comprises an impulse source repeatedly disturbing the balance measurement condition of said device.

* * * * *

UNITED STATES PATENT AND TRADEMARK OFFICE
CERTIFICATE OF CORRECTION

PATENT NO. : 3,997,769   Page 1 of 2
DATED : December 14, 1976
INVENTOR(S) : Gunter HANSMANN It is certified that error appears in the above-identified patent and that said Letters Patent are hereby corrected as shown below:

Col. 4, formula at line 34 should read: $\Delta U/U \cdot I \cdot U \cdot t \cdot \Delta t = \hbar/2$ Col. 6, line 8: the relationship should read: $\Delta E \cdot \Delta t \geq \hbar$ Col. 6, line 10: the first relationship should read: $\Delta E \cdot \Delta t = \hbar$ Col. 7, line 22: the equation should read:
$$(\bar{x}_n = (\bar{x}_{n-1} (n-1/n) + (x_n (1/n)$$

Col. 7, line 28 $\bar{x}_n^{\,2}$ to -- $x_n^2$ ; line 29, change $x_n^2$ to -- $\bar{x}_n^{\,2}$ --

Col. 8, change "001 or 0001" to -- $z = .001$ or $.0001$ -- in line 19.

8, line 23, the formula should read: $|\bar{x}_n - \bar{x}_{n-1}| <$

Col.10, lines 1 to the end of sentence at line 4, change to read:

$(\bar{x}_n - .001$ and $(\bar{x}_n$ have the same distances $\delta_1 x = (\bar{x}_n - (x_i$ from the mean value $(\bar{x}_n$. Likewise all the measured values $x_j$ in the range between $(\bar{x}_n$ and $(\bar{x}_n + .001$ have the same distances $\delta_2 x = (x_j - (\bar{x}_n$ from the mean value $(\bar{x}_n$.

Col. 11, change the Register Locations G19, G20, G21, G25 to read as follows: G19 ($z = .001$
G20 ($\bar{x}_n +$ ($z$      When $|\bar{x}_n - \bar{x}_{n-1}| < .001$
G21 ($\bar{x}_n -$ ($z$

UNITED STATES PATENT OFFICE
CERTIFICATE OF CORRECTION

Patent No. 3,997,769  Dated December 14, 1976

Inventor(s) Gunter Hansmann

It is certified that error appears in the above-identified patent and that said Letters Patent are hereby corrected as shown below:

G25    $gw = \max(m,k)$

Signed and Sealed this

Twenty-eighth Day of June 1977

[SEAL]

Attest:

RUTH C. MASON  
*Attesting Officer*

C. MARSHALL DANN  
*Commissioner of Patents and Trademarks*